(12) United States Patent
Tsukamoto

(10) Patent No.: US 7,462,682 B2
(45) Date of Patent: Dec. 9, 2008

(54) ORTHOCHROMATIC POLYESTER RESIN COMPOSITION AND MOLDING PRODUCT THEREOF

(75) Inventor: Ryoji Tsukamoto, Matsuyama (JP)

(73) Assignee: Teijin Fibers Limited, Osaka (JP)

( * ) Notice: Subject to any disclaimer, the term of this patent is extended or adjusted under 35 U.S.C. 154(b) by 533 days.

(21) Appl. No.: 10/526,664

(22) PCT Filed: Jun. 30, 2004

(86) PCT No.: PCT/JP2004/009581

§ 371 (c)(1), (2), (4) Date: Mar. 4, 2005

(87) PCT Pub. No.: WO2005/003235

PCT Pub. Date: Jan. 13, 2005

(65) Prior Publication Data

US 2005/0245677 A1    Nov. 3, 2005

(30) Foreign Application Priority Data

Jul. 7, 2003 (JP) ............... 2003-271284
Feb. 3, 2004 (JP) ............... 2004-026610

(51) Int. Cl.
*C08G 63/00* (2006.01)
(52) U.S. Cl. .............. 528/279; 524/601; 524/604; 524/605; 528/280
(58) Field of Classification Search ............ 524/601, 524/604, 605; 528/279, 280
See application file for complete search history.

(56) References Cited

U.S. PATENT DOCUMENTS

| 4,481,314 A | 11/1984 | Rule |
| 4,654,399 A | 3/1987 | Callander et al. |
| 6,140,477 A | 10/2000 | Matsumoto et al. |
| 6,197,851 B1 | 3/2001 | Maxwell et al. |
| 6,346,070 B1 * | 2/2002 | Ohmatsuzawa et al. ..... 528/279 |

FOREIGN PATENT DOCUMENTS

| EP | 1 013 692 A2 | 6/2000 |
| EP | 1013692 A2 * | 6/2000 |
| EP | 1 110 988 A1 | 6/2001 |
| EP | 1 170 339 A2 | 1/2002 |
| EP | 1 221 627 A2 | 7/2002 |
| EP | 1 541 613 A1 | 6/2005 |
| GB | 1 471 577 | 4/1977 |
| JP | 11-158257 | 6/1999 |
| JP | 11-158361 A | 6/1999 |
| JP | 2001-089557 | 4/2001 |
| JP | 2003-119266 A | 4/2003 |

OTHER PUBLICATIONS

XP-002384585, Database WPI, Section Ch, Week 198339, Derwent Publications Ltd.—English Abstract of JP 58-140218A (Teijin, Ltd.) Aug. 19, 1983.

* cited by examiner

*Primary Examiner*—Bernard Lipman
(74) *Attorney, Agent, or Firm*—Sughrue Mion, PLLC

(57) ABSTRACT

A tinted polyester resin composition having good color and useful for many uses (fibers, films and other formed articles) contains an aromatic polyester polymer and a tinting agent; the tinting agent is contained in a content of 0.1 to 10 ppm by mass in the composition, and has a maximum absorption wavelength in the range of from 540 to 600 nm in the absorption spectrum in the wavelength band of from 380 to 780 nm, determined in a solution of the tinting agent in a concentration of 20 mg/liter in chloroform in an optical path having a length of 1 cm; and ratios of optical absorbances $A_{400}$, $A_{500}$, $A_{600}$ and $A_{700}$ of visible light spectra at wavelengths of 400 nm, 500 nm, 600 nm and 700 nm respectively to an optical absorbance $A_{max}$ in the visible light spectrum at the maximum absorption wavelength, determined in the above-mentioned chloroform solution at a optical path having a length of 1 cm, satisfy the requirements of $0.00 \leq A_{400}/A_{max} \leq 0.20$, $0.10 \leq A_{500}/A_{max} \leq 0.70$, $0.55 \leq A_{600}/A_{max} \leq 1.00$ and $0.00 \leq A_{700}/A_{max} \leq 0.05$.

15 Claims, No Drawings

ORTHOCHROMATIC POLYESTER RESIN COMPOSITION AND MOLDING PRODUCT THEREOF

TECHNICAL FIELD

The present invention relates to a tinted polyester resin composition and a shaped article made thereof. More particularly, the present invention relates to a polyester resin composition, containing cobalt metal element in an extremely small amount, tinted to a desired color tone and having an excellent formability and a shaped article thereof.

BACKGROUND ART

It is well known that polyester resins, particularly polyethylene terephthalate, polyethylene naphthalate, polytrimethylene terephthalate and polytetramethylene terephthalate resins have excellent mechanical, physical and chemical performances and, therefore, are widely utilized for fibers, films and other shaped articles.

Among these polyesters, polyethylene terephthalate resin is usually produced by a two step process. Namely, in the first step, an ethylene glycol ester of terephthalic acid and/or a polymer with a low degree of polymerization produced by a method in which terephthalic acid and ethylene glycol are directly subjected to a esterification reaction; or a method in which a lower alkyl ester of terephthalic acid, for example, dimethyl terephthalate, and ethylene glycol are subjected to a transesterification reaction, or a method in which terephthalic acid and ethylene oxide are reacted with each other; and then in a second step, the reaction product of the first step is subjected to a polycondensation reaction in the presence of a polymerization catalyst, while heating the reaction mixture under a reduced pressure with the polymerization degree of the resultant product reached a desired level, to produce the target polyethylene terephthalate.

It is well known that, in the polyester resin produced by the above-mentioned process, the reaction rate and the quality of the resultant polyester resin greatly depend on the type of the catalyst used in the polycondensation step. With respect to the above-mentioned dependency, it is also known from the previous research results that when a catalyst comprising an antimony compound or a germanium compound which has been widely used as a polycondensation catalyst, is used, the polycondensation can be carried out at an excellent efficiency and the resultant polyester resin exhibits a good color tone.

However, when continuous melt spinning of a polyester produced by using an antimony compound as a polycondensation catalyst is carried out over a long period of time, there arises the problems that foreign matter adheres and is deposited around a spinneret for melt spinning. This foreign matter may be referred to as spinneret foreign matter hereinafter. The deposited foreign matter causes a bending phenomenon of the molten polyester streams extruded from the spinneret, which leads to the decrease in formability of the polymer melt and the occurrence of fuzz and/or breakage of filament yarns obtained in the melt-spinning and drawing steps.

Generally, as catalysts for the polyester usable for PET bottles, etc., germanium compounds are used. In this connection, there are problems that germanium is a rare metal and is expensive and, thus, the resultant resin products are also expensive.

There has been proposed to use, as other polycondensation catalyst than the antimony compounds and the germanium compounds, titanium compounds, for example, titanium tetrabutoxide. When titanium compounds are used, the above-mentioned problems on the formability of the polyester melt, derived from the deposition of the spinneret foreign matter, can be solved. However, another problems, that the resultant polyester resin is colored yellowish and exhibits an insufficient thermal stability of the polyester melt, occur.

For example, Japanese Examined Patent Publications No. 48-2229 (Patent Reference 1) and No. 47-26597 (Patent Reference 2) disclose that, as titanium compounds other than those mentioned above, titanium hydroxide or α-titanic acid is used as a catalyst for the production of polyesters. However, when titanium hydroxide is used, it is not easy to pulverize titanium hydroxide, and when α-titanic acid is used, α-titanic acid has a low stability of the chemical structure thereof and, thus, is difficult to preserve and handle. Therefore, these titanium components are not appropriate to use for industrial practice, and hardly produce a polyester polymer having a good color (b value).

To solve the above-mentioned problems, there have been attempted to use a product obtained by a reaction of a titanium compound with a specific phosphorus compound as disclosed in WO 01/00706 (Patent Reference 3) and WO 03/008479 (Patent Reference 4), and a non-reacted mixture or a reaction compound of a titanium component with a specific phosphorus compound as disclosed in WO 03/027166 (Patent Reference 5), as a catalyst for the production of the polyester polymer. It is true that the above-mentioned catalysts contribute to enhancing the thermal stability of the polyester melt and to improving the color of the resultant polymer. However, these catalyst cause the reaction rate in the production of the polyester to be low, and thus a problem, that the productivity of the polyester is somewhat low, occurs.

For the purpose of enhancing the stable formability of the polyester the method in which no antimony is used is an effective means. However, the no-antimony method causes the color of the resultant polymer and polymer products to be unsatisfactory and thus has not been utilized in practice. Therefore, a polyester produced by using a catalyst containing no antimony and having a good color is required.

In the production of the above-mentioned polyester, usually, the polymerization temperature must be controlled to approximately from 280 to 300° C. However, it is known that this high polymerization temperature causes a problem that the resultant polymer is discolored due to thermal decomposition of the polymer, namely, the polyester per se is colored yellow.

For the purpose of solving the yellow-coloring problem as mentioned above, usually, a cobalt compound is mixed into the polyester polymer to decrease the yellow-coloring, as disclosed in, for example, Japanese Unexamined Patent Publication No. 51-128397 (Patent Reference 6). The addition of the cobalt compound can certainly improve the color (b value) of the polyester polymer. However, the addition of the cobalt compound causes a plurality of problems in that, regarding the thermal stability of the melt of the polyester polymer, the added cobalt compound deposits in the polymer and causes foreign matter to be generated, and the processability of the polyester polymer, to produce a desired shaped article, and the quality of the resultant shaped article are probably affected. Further, in the case where a manganese compound is used as a catalyst for the transesterification reaction, and a cobalt compound is added, as a tinting agent, into the reaction mixture, the resultant polyester polymer has the problems that the cloths and fibers made from the resultant polyester polymer may be discolored when treated with a bleaching agent.

Also, as an attempt of improving the color of the polyester polymer, a polyethylene naphthalate resin knead-mixed with a dye is disclosed in, for example, Japanese Unexamined Patent Publication No. 11-158257 (Patent Reference 7), Japanese Unexamined Patent Publication No. 3-231918 (Patent Reference 8), Japanese Unexamined Patent Publication No. 11-158257 (Patent Reference 9) and Japanese Unexamined Patent Publication No. 11-158361 (Patent Reference 10).

Reference List
Patent Reference 1 JP-48-2229-B
Patent Reference 2 JP-47-26597-B
Patent Reference 3 WO 01/00706 pamphlet
Patent Reference 4 WO 03/008479 pamphlet
Patent Reference 5 WO 03/027166 pamphlet
Patent Reference 6 JP-51-128397-A
Patent Reference 7 JP-11-158257-A
Patent Reference 8 JP-3-231918-A
Patent Reference 9 JP-11-158257-A
Patent Reference 10 JP-11-158361-A

DISCLOSURE OF THE INVENTION

An object of the present invention is to provide a tinted polyester resin composition having a good white color, substantially no or little generation of foreign matter adhered to a shaping orifices or dies even when a shaping process, for example, fiber-forming process or film-forming process is continuously carried out over a long period of time, and a good formability, and a shaped article produced from the tinted polyester resin composition and having a good appearance.

The above-mentioned object can be attained by the tinted polyester resin composition of the present invention and a shaped article made from the same.

The tinted polyester resin composition of the present invention comprises an aromatic polyester polymer and a tinting agent, wherein (a) the tinting agent is present in a content of 0.1 to 10 ppm by mass, (b) a maximum absorption wavelength of the tinting agent in an absorption spectrum in the wavelength range of 380 to 780 nm is in the range of 540 to 600 nm, determined in a chloroform solution of the tinting agent in a concentration of 20 mg/liter and over an optical path having a length of 1 cm, and (c) ratios of optical absorbances $A_{400}$, $A_{500}$, $A_{600}$ and $A_{700}$ of visible light spectra at wavelengths of 400 nm, 500 nm, 600 nm and 700 nm respectively to an optical absorbance $A_{max}$ in the visible light spectrum at the maximum absorption wavelength, of the tinting agent, determined in the above-mentioned chloroform solution of the tinting agent at the optical path having a length of 1 cm, satisfy the requirements (1) to (4):

$$0.00 \leq A_{400}/A_{max} \leq 0.20 \quad (1)$$

$$0.10 \leq A_{500}/A_{max} \leq 0.70 \quad (2)$$

$$0.55 \leq A_{600}/A_{max} \leq 1.00 \quad (3)$$

$$0.00 \leq A_{700}/A_{max} \leq 0.05 \quad (4)$$

In the tinted aromatic polyester resin composition of present invention, the tinting agent is preferably selected from tinting coloring matters having a mass reduction-initiating temperature of 250° C. or more, determined by heating the coloring matters in a nitrogen gas atmosphere at a temperature-increasing rate of 10° C./minute while measuring the mass of the coloring matters by using a thermobalance.

In the tinted aromatic polyester resin composition of the present invention, the cobalt metal element in the composition is preferably present in a content controlled to 10 ppm by mass or less on the basis of the mass of the composition.

In the tinted aromatic polyester resin composition of the present invention, a metal element having a true specific gravity of 5.0 or more in the composition is preferably present in a content controlled to 10 ppm by mass on the basis of the mass of the composition.

In the tinted aromatic polyester resin composition of the present invention, the aromatic polyester polymer is preferably one produced by using a catalyst comprising at least one member selected from titanium compounds and aluminum compounds.

In the tinted aromatic polyester resin composition of the present invention, preferably, the aromatic polyester polymer is one produced by using a catalyst comprising at least one member selected from titanium compounds and phosphorus compounds; a molor ratio of phosphorus atoms to titanium atoms contained in the catalyst satisfies the requirement (5):

$$1 \leq M_p/M_{Ti} \leq 15 \quad (5)$$

wherein $M_p$ and $M_{Ti}$ respectively represent contents in millimoles of phosphorus element and titanium atoms contained in the aromatic polyester polymer; and the molar amount of the titanium metal element in the residual catalyst dissolved and contained in the polyester resin composition is in the range of $2 \times 10^{-3}$ to $15 \times 10^{-3}$% on the basis of the molar amount of all dicarboxylic acids continued, as a polyester-constituting component, in the above-mentioned polymer.

In the tinted aromatic polyester resin composition of the present invention, the aromatic polyester polymer preferably comprises, as a principal component, at least one member selected from the group consisting of polyethylene terephthalate, polyethylene naphthalate, polytrimethylene terephthalate, polytrimethylene naphthalate, polytetramethylene terephthalate and polytetramethylene naphthalate.

In the tinted aromatic polyester resin composition of the present invention, the tinting agent preferably comprises a blue color-tinting coloring matter and a violet color-tinting coloring matter in a mass ratio in the range of from 90:10 to 40:60.

In the tinted aromatic polyester resin composition of the present invention, the tinting agent preferably comprises a blue color-tinting coloring matter and a red or orange color-tinting coloring matter in a mass ratio in the range of from 98:2 to 80:20.

In the tinted aromatic polyester resin composition of the present invention, the tinting agent is preferably one mixed, at one or more stages in the production procedure of the aromatic polyester polymer, into a reaction mixture in the production procedure.

In the tinted aromatic polyester resin composition of the present invention, the tinting agent is preferably one knead-mixed into the aromatic polyester polymer in the state of a melt.

The tinted and shaped polyester resin article of the present invention is one produced from the tinted polyester resin composition as defined in any one of claims 1 to 11.

In the tinted and shaped polyester resin article of the present invention, the article is preferably selected from fiber products.

In the tinted and shaped polyester resin article of the present invention, the article is preferably selected from film products.

In the tinted and shaped polyester resin article of the present invention, the article is preferably selected from bottle products.

The polyester resin composition of the present invention is one tinted with a specific tinting agent having been a specific tinting effect, thus has a good color even in the case where the polyester resin composition having been prepared from a polyester resin produced without using a catalyst containing antimony or germanium, and can provide a shaped article having a bright color.

The tinted polyester resin composition of the present invention can solve the defects, namely an degradation in color (increases in a* value and b* value), of the polyester produced in the presence of a conventional catalyst containing no antimony and no germanium, while maintaining the excellent formability and mechanical and chemical performances unchanged. Therefore, the shaped articles, for example, fibers and films, produced from the polyester resin composition of the present invention, have a good color and are highly useful in practice.

BEST MODE FOR CARRYING OUT THE INVENTION

The polyester resin composition of the present invention comprises an aromatic polyester polymer and a tinting agent.

The aromatic polyester polymer usable for the present invention is obtained by a polycondensation reaction of an aromatic dicarboxylic acid component with a glycol component. The aromatic dicarboxylic acid component preferably comprises, as a principal component, for example, a member selected from terephthalic acid, naphthalene dicarboxylic acid and ester-forming derivatives of the acids (for example, di(lower alkyl) diesters, etc.). The glycol component comprises, as a principal component, a member selected from, for example, ethylene glycol, trimethylene glycol and tetramethylene glycol. The aromatic dicarboxylic acid component and the glycol component may comprise, in addition to the above-mentioned principal components, one or more copolymerization components selected from, for example, isophthalic acid, aliphatic dicarboxylic acids (for example, adipic acid, etc.), aromatic dihydroxyle compounds, (for example, bisphenol A, etc.) and hydroxycarboxylic acids (for example, hydroxybenzoic acid, etc.).

The above-mentioned aromatic polyester polymer preferably comprises, as a principal constitutional component, at least one member selected from the group consisting of polyethylene terephthalate, polyethylene naphthalate, polytrimethylene terephthalate, polytrimethylene naphthalate, polytetramethylene terephthalate and polytetramethylene naphthalates. Among them, the polyethylene terephthalate is preferably contained as a principal constitutional component in the aromatic polyester polymer. The term "a principal constitutional component" refers to a component in an amount corresponding to 80 molar % or more of the total amount of all the repeating units, of the aromatic polyester polymer.

In the polyester resin composition of the present invention, the content of metal elements having a true specific gravity of 5.0 or more, based on the mass of the resin composition, is preferably controlled to a level of 10 ppm or less by mass.

The metal elements having a true specific gravity of 5.0 or more are usually derived from metallic compounds contained in catalyst, metallic tinting agents, and delustering agents which are contained in the polyester polymer. In concrete terms, the metal elements include antimony, germanium, manganese, cobalt, cerium, tin, zinc, lead, and cadmium. However, the metal elements having a true specific gravity of 5.0 or more do not include titanium, aluminum, calcium, magnesium, sodium and potassium.

The influence of the metal elements on the polyester resin composition of the present invention varies in response to the type of the metal contained in the polyester resin composition. For example, in the case where the content of antimony metal is more than 10 ppm by mass, foreign matter is generated in a melt-spinning procedure or a film-forming procedure and adhere around a spinning orifices or extruding dies so as to affect on the continuous formability over a long period. In the case of germanium, the metal per se is expensive and a high content thereof causes the resultant polyester resin composition to have an increased price. Also, in the case of lead or cadmium, the metal per se is poisonous and a high content of a poisonous metal in the polyester polymer is not preferable. The content of the high specific gravity metal element in the polyester resin composition is preferably 0 to 7 ppm by mass, more preferably 0 to 5 ppm by mass.

In the polyester resin composition of the present invention, the content of the cobalt compound, in terms of cobalt metal element, is preferably controlled to 10 ppm by mass or less, more preferably 0 to 7 ppm by mass, on the basis of the mass of the polyester resin composition. The cobalt compound contributes to improving the color of the polyester resin. However, in the case where the content of the cobalt metal element exceeds 10 ppm by mass, the resultant polyester resin composition may exhibit insufficient heat resistance and melt stability and thus may be thermally decomposed in the melt spinning. The thermal decomposition product of the cobalt compound may cause the resultant polyester resin composition and the shaped article from the resin composition to exhibit degraded qualities.

The polyester resin composition of the present invention contains the tinting agent in an amount of 0.1 to 10 ppm by mass on the basis of the mass of the polyester resin composition. The tinting agent usable for the polyester resin composition of the present invention includes organic polycyclic aromatic dyes, organic solvent-soluble coloring matters for example, oil-soluble dyes, and pigments. In concrete terms, the tinting agent for the present invention include blue color-tinting coloring matters, violet color-tinting coloring matters, red color-tinting coloring matters, and orange color-tinting coloring matters which will be explained hereinafter. These coloring matters for tinting may be used alone or in a mixture of two or more thereof.

Among them, the mixtures of two or more coloring matters for tinting is preferably utilized due to the fact that the coloring matter mixtures for tinting easily satisfy the requirements concerning the optical absorption spectra of the tinting agent.

For the tinting agent for the present invention, the organic solvent-soluble coloring matters, particularly oil-soluble dyes are preferably used. The blue tinting coloring matters include, for example, C.I. Solvent Blue 11, C.I. Solvent Blue 25, C.I. Solvent Blue 35, C.I. Solvent Blue 36, ("POLYSYN-THRENE BLUE RLS"™) C.I. Solvent Blue 45 (Telasol Blue RLS), C.I. Solvent Blue 55, C.I. Solvent Blue 63, C.I. Solvent Blue 78, C.I. Solvent Blue 83, C.I. Solvent Blue 87 and C.I. Solvent Blue 94; the violet tinting coloring matters include, for example, C.I. Solvent Violet 8, C.I. Solvent Violet 13, C.I. Solvent Violet 14, C.I. Solvent Violet 21, C.I. Solvent Violet 27, C.I. Solvent Violet 28, and C.I. Solvent Violet 36 ("PLAST VIOLET 8855-T™"); the red tinting coloring matters include, for example, C.I. Solvent Red 24, C.I. Solvent Red 25, C.I. Solvent Red 27, C.I. Solvent Red 30, C.I. Solvent Red 49, C.I. Solvent Red 52, C.I. Solvent Red 100, C.I. Solvent Red 109, C.I. Solvent Red 111, C.I. Solvent Red 121, ("POLYSYNTHRENE RED GFP™") C.I. Solvent Red 135, C.I. Solvent Red 168, and C.I. Solvent Red 179; and the orange color tinting coloring matters include, for example, C.I. Solvent Orange 60, etc.

The tinting agent contained in the polyester resin composition of the present invention has a maximum absorption wavelength in the range of 540 to 600 nm in an absorption spectrum in the wavelength range of 380 to 780 nm determined in a chloroform solution of the tinting agent in a concentration of 20 mg/liter at an optical path having a length of 1 cm, and has ratios of optical absorbances $A_{400}$, $A_{500}$, $A_{600}$ and $A_{700}$ of visible light spectra at wavelength of 400 nm, 500 nm, 600 nm and 700 nm respectively to an optical absorbance $A_{max}$ in the visible light spectrum at the maximum absorption wavelength, determined in the above-mentioned chloroform solution of the tinting agent at the optical path having a length of 1 cm, and satisfying the requirements (1) to (4):

$$0.00 \leq A_{400}/A_{max} \leq 0.20 \quad (1)$$

$$0.10 \leq A_{500}/A_{max} \leq 0.70 \quad (2)$$

$$0.55 \leq A_{600}/A_{max} \leq 1.00 \quad (3)$$

$$0.00 \leq A_{700}/A_{max} \leq 0.05 \quad (4)$$

In the requirements (1) to (4), $A_{400}$, $A_{500}$, $A_{600}$, and $A_{700}$ respectively represent optical absorbances in the visible light absorption spectra at wavelength of 400 nm, 500 nm, 600 nm and 700 nm, and $A_{max}$ represents an optical absorbance in the visible light absorption spectrum at a maximum absorption wavelength.

The absorption spectrum refers to a spectrum measured by a usual spectrophotometer. In the case where the maximum absorption wavelength in the absorption spectrum of the solution of the tinting agent contained in the polyester resin composition is less than 540 nm, the resultant polyester resin composition exhibits too deep a reddish color tone and thus is not preferable, and where the maximum absorption wavelength is more than 600 nm, the resultant polyester resin composition exhibits too deep a bluish color tone, and thus is not preferable.

The maximum absorption wavelength is preferably in the range of from 545 to 595 nm, more preferably from 550 to 590 nm.

In the case wherein the optical path having a length of 1 cm of the chloroform solution of the tinting agent usable for the polyester resin composition of the present invention in a concentration at 20 mg/liter, the ratios of the absorptions at the wavelengths as mentioned above to the absorption at the maximum absorption wavelength do not satisfy at least one of the above-mentioned requirements (1) to (4), the resultant polyester resin composition exhibit too deep tinted color tone.

The values of $A_{400}/A_{max}$, $A_{500}/A_{max}$, $A_{600}/A_{max}$, and $A_{700}/A_{max}$ satisfying the requirements (1) to (4) are preferably in the range specified by the equations (6) to (9):

$$0.00 \leq A_{400}/A_{max} \leq 0.15 \quad (6)$$

$$0.30 \leq A_{500}/A_{max} \leq 0.60 \quad (7)$$

$$0.60 \leq A_{600}/A_{max} \leq 0.95 \quad (8)$$

$$0.00 \leq A_{700}/A_{max} \leq 0.03 \quad (9)$$

in which equations, $A_{400}$, $A_{500}$, $A_{600}$, and $A_{700}$ are as defined above.

In the polyester resin composition of the present invention, if the content of the above-mentioned tinting agent contained therein is less than 0.1 ppm by mass, the resultant polyester resin composition exhibits too deep a yellowish color tone.

Also, if the tinting agent content is more than 10 ppm by mass, the resultant polyester resin composition exhibits a decreased lightness and an increased grayish color tone and thus is not preferable.

The content of the tinting agent is preferably in the range of from 0.3 ppm by mass to 9 ppm by mass, more preferably from 0.5 ppm by mass to 8 ppm by mass.

The apparent white color of the polyester resin composition of the present invention is controlled by the tinting agent. Namely, preferably, in the L* a* b* color specification system, the polyester resin composition heat-treated at a temperature of 140° C. for 2 hours to crystallize the resin, the a* value is in the range of from −9 to 0, and the color b* value is in the range of from −2 to +10. The a* value and the b* value of the resin composition vary in response to the amount of the tinting agent. If the a* value is less than −9, the resultant polyester resin composition exhibits too deep a greenish color tone, and if the a* value is more than 0, the resultant polyester resin composition exhibits too deep a reddish color tone, and thus is not preferable. Also, if the b* value is less than −2, the resultant polyester resin composition exhibits too deep a bluish color tone and if it is more than +10, the resultant polyester resin composition exhibits too deep a yellowish color tone, and thus is not preferable. The a* value is in more preferably the range of from −8 to −1, still more preferably from −7.5 to −2. Also, the b* value is more preferably in the range of from −1 to +9, still more preferably from 0 to 8.

The tinting agent for the polyester resin composition of the present invention preferably has a mass reduction-initiating temperature ($T_1$) of 250° C. or more, determined by heating the tinting agent in a nitrogen gas atmosphere at a temperature-increasing rate of 10° C./minute while measuring the mass of the tinting agent by using a thermobalance, in accordance with JIS K 7120. The mass reduction-initiating temperature is an indicator of heat resistance which is provided on the tinting agent. If the mass reduction-initiating temperature of the tinting agent is less than 250° C. or less, this tinting agent may have an insufficient heat resistance, and thus may cause the finally resultant polyester resin composition to be discolored.

The mass reduction-initiating temperature is more preferably 300° C. or more but not more that 500° C. More preferably, the tinting agent is not decomposed at a temperature at which the aromatic polyester polymer is in the state of a melt.

There is no specific limitation to the process for producing the aromatic polyester polymer contained in the polyester resin composition of the present invention, and thus the aromatic polyester polymer can be produced by the conventional production processes.

Namely, first, a glycol ester of a dicarboxylic acid and/or an oligomer thereof is produced by a direct esterification reaction of the dicarboxylic acid component comprising, for example, terephthalic acid with a glycol component comprising, for example, ethylene glycol, or a transesterification reaction of a di(lower alkyl)diester of a dicarboxylic acid component, for example, dimethyl terephthalate, with a glycol component comprising, for example, ethylene glycol. Then the reaction product is subjected to a poly-condensation reaction in the presence of a polymerization catalyst by heating the reaction product under a reduced pressure until the degree of polymerization reaches the desired degree, to produce the target aromatic polyester polymer. In the case where a polyester structure other than the that of the aromatic polyester polymer is contained as a copolymerization component, a method in which the aromatic polyester component and the copolymerization component are copolymerized or another method in which the above-mentioned two different types of the polyesters are produced by a known process, and then the resultant polyesters are blended to each other, can be utilized.

The aromatic polyester polymer usable for the polyester resin composition of the present invention includes the polymers produced by using a catalyst containing at least one compound selected from titanium compounds and aluminum compounds. There is no specific limitation to the type of the titanium compounds. Namely, the titanium compounds include usual titanium compounds usable as a polycondensation catalyst for polyesters, for example, titanium acetate and tetra-n-butoxytitanium.

Preferably, the titanium compounds are selected from the compounds represented by the general formula (I) shown below, reaction product of the compounds represented by the general formula (I) with the aromatic polycarboxylic acids represented by the general formula (II) as shown below or anhydrides of the acids, and the compounds represented by the general formula (III) shown below.

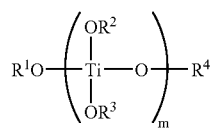
(I)

In the formula (I), $R^1$, $R^2$, $R^3$ and $R^4$ respectively and independently from each other represent an alkyl group or a phenyl group, m represents an integer of 1 to 4, when m is 2, 3 or 4, two, three or four $R^2$ and $R^3$ may be the same as each other or different from each other. The above-mentioned alkyl group preferably contains 1 to 10 carbon atoms, more preferably 1 to 6 carbon atoms.

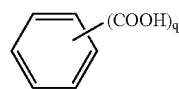
(II)

In the formula (II), q represents an integer of 2 to

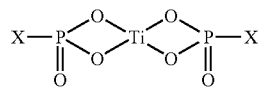
(III)

In the formula (III), X represents an alkyl or alkoxy group having 1 to 20 carbon atoms or an aryl or aryloxy group having 6 to 20 carbon atoms.

There is no specific limitation to the types of the aluminum compound for the polycondensation catalyst. For example, aluminum acetylacetonate has a high stability and is easily handled and is excellent as a catalyst.

The above-mentioned titanium compounds and the aluminum compounds may be used alone or in a mixture of two or more thereof. Particularly and preferably, the titanium compound is used alone.

Even in the case where the compounds represented by the general formula (I), the reaction products of the compounds represented by the general formula (I) with the aromatic polycarboxylic acids represented by the general formula (II) or anhydrides of the acids, and the compounds represented by the general formula (III) are used alone, a good result can be obtained.

Also, as a catalyst for the production of the aromatic polyester polymer, antimony compounds and/or germanium compounds can be used. There is no specific limitation to the type of the antimony compounds and the germanium compounds, and conventional antimony compounds and germanium compound as polymerization catalyst for polyesters can be used for the polyester polymer of the present invention. For example, diantimony trioxide, antimony acetate, antimony pentachloride, germanium dioxide or germanium tetralkoxides can be utilized. Among them, diantimony trioxide and/or germanium dioxide is preferably utilized.

Regarding the titanium tetraalkoxides and/or the titanium tetraphenoxide represented by the general formula (I), there is no specific limitation as long as each of $R^1$ to $R^4$ is an alkyl group and/or a phenyl group, and titanium tetraisoproxide, titanium tetra-n-propoxide, titanium tetra-n-butoxide, titanium tetraethoxide and titanium tetraphenoxide are preferably utilized. The aromatic polycarboxylic acid represented by the general formula (II) and anhydrides thereof to be reacted with the above-mentioned titanium compounds, preferably include phthalic acid, trimellitic acid, hemimellitic acid and pyromellitic acid and anhydrides of the above-mentioned acids.

The reaction of the above-mentioned titanium compounds with the aromatic polycarboxylic acids or anhydrides thereof is carried out by, for example, the following procedure. Namely, an aromatic polycarboxylic acid or anhydride thereof is entirely or partially dissolved in a solvent; into the resultant solution, a titanium compound is added dropwise and the resultant mixture is subjected to a reaction at a temperature of from 0 to 200° C. for 30 minutes. Also, optionally, after the dropwise addition of the titanium compound, the remaining amount of the aromatic polycarboxylic acid or anhydride thereof is mixed into the mixture. Further, the compounds represented by the general formula (III) can be produced by reacting the compounds represented by the general formula (I) with a monoalkyl phosphonic acid, a monoarylphosphonic acid, a monoalkyl phosphate or a monoaryl phosphate at a temperature in the range of from 70 to 150° C.

In the polyester resin composition of the present invention, preferably, the aromatic polyester polymer is one produced by using a catalyst comprising a titanium compound and a phosphorus compound, the molar ratio of phosphorus element to titanium metal element contained in the above-mentioned catalyst satisfies the following equation (5):

$$1 \leq M_p/M_{Ti} \leq 15 \qquad (5)$$

in which equation (5) $M_p$ and $M_{Ti}$ respectively represent concentrations in millimoles of phosphorus element and titanium metal element contained in the aromatic polyester polymer; and the molar amount of titanium metal element in the residual catalyst dissolved and contained in the polyester resin composition comprising the aromatic polyester polymer corresponds to $2 \times 10^{-3}$ to $15 \times 10^{-3}$% of the molar amount of all the dicarboxylic acids contained, as a polymer-constituting component, in the above-mentioned polymer.

It should be noted that the amount of titanium metal element contained in the aromatic polyester polymer and derived from the titanium compounds soluble in the polyester polymer does not include the amount of titanium metal element derived from inorganic titanium compounds, for example, titanium dioxide, insoluble in the polyester polymer, and is limited to the amount of titanium metal element derived from organic titanium compounds which are usually used as a catalyst and organic titanium compounds continued, as impurities, titanium oxide used as a delustering agent. In the case where the above-mentioned amount of the titanium metal element is less than $2\times10^{-3}\%$, the polycondensation reaction may not be sufficiently proceeded. Also, if the amount is more than $5\times10^{-3}\%$, the resultant polyester resin composition may have a yellowish color tone, and exhibit a decreased heat resistance.

The content of the titanium metal element is more preferably in the range of from $3\times10^{-3}$ to $10\times10^{-3}\%$. Also, in the case where the molar ratio $M_p/M_{Ti}$ of phosphorus element to titanium metal element derived from the compounds soluble in the aromatic polyester polymer contained in the polymer is less than 1, the resultant polyester resin compound has a yellowish color tone and, if the ratio is more than 15, the catalyst causes the polycondensation reaction to be carried out at a slow rate. The ratio $M_p M_{Ti}$ is preferably in the range of from 2 or more to not more than 10.

To keep the amounts of the titanium metal element and the phosphorus element derived from the compounds soluble in the polyester contained in the polyester resin composition in a preferable ratio, the phophorus compound is mixed into the polyester resin composition produced in the presence of a titanium-containing catalyst. Otherwise, the preferable ratio can be attained by, for example, using, as a catalyst, the compound represented by the above-mentioned general formula (III). There is no limitation to the compounds of the formula (III). More preferably, the compounds of the formula (III) is selected from phosphoric acid, phosphorous acid, phosphonic acid, phosphinic acid and alkyl esters, aryl esters and phosphonoacetates of the above-mentioned acids. The mixing of the above-mentioned phosphorus compound into the polyester resin composition may be carried out at any stage as long as, after the transesterification reaction or the esterification reaction, the reaction is substantially completed. Usually, it is preferred that the mixing is carried out immediate after the esterification or the transesterification reaction is completed, and then the resultant mixture is subjected to the polycondensation reaction.

There is no specific limitation to the intrinsic viscosity of the polyester resin composition (determined in a solvent consisting of ortho-chlocophenol at a temperature of 35° C.). Preferably, the intrinsic viscosity is in the range in which the resultant polyester resin composition can be used for conventional fibers, films and shaped articles, for example, bottles, in concrete term, within the range of from 0.40 to 1.00. Also, the polyester resin composition of the present invention is preferably selected from those having an intrinsic increased viscosity by a solid phase polymerization.

The polyester resin composition of the present invention optionally contains an additive, for example, a lubricant, an antioxidant, a solid phase polymerization accelerator, a fluorescent brightening agent, an antistatic agent, an antibacterial agent, ultraviolet ray-absorber, light stabilizer, thermostabilizer, light screening agent, and delustering agent. For example, the delustering agent, for example, titanium dioxide and the antioxidant are preferably contained in the composition. These additives is preferably used in a small amount, preferably and the contents of metals having a true specific gravity of 5.0 or more and halogen elements are preferably very small. As an antioxidant, hindered phenolic antioxidants are preferably employed. In concrete terms, the hindered phenolic antioxidants include pentaerythritol-tetrakis, [3-(3, 5-di-tert-butyl-4-hydroxyphenyl)propionate], 3,9-bis{2-[3-(3-tert-butyl-4-hydroxy-5-methylphenyl)propionyloxy]-1,1-dimethylethyl}-2,4,8,10-tetraoxaspyro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl) benzene, 1,3,5-tris(4-tert-butyl-3-hydroxy-2,6-dimethylbenzene)isophthalic acid, triethylglycol-bis[3-(3-tert-butyl-5-methyl-4-hydroxyphenyl)propionate], 1,6-hexanediol-bis[3-(3,5-di-tert-butyl-4-hydroxyphenyl) propionate], 2,2-thio-diethylene-bis[3-(3,5-di-tert-butyl-4-hydroxyphenyl)propionate], octadecyl-[3-(3,5-di-tert-butyl-4-hydroxyphenyl)propionate], etc. The hindered phenolic antioxidant is preferably contained in a content of 1% by mass or less on the basis of the polyester resin composition. If the content of the antioxidant is more than 1% by mass, it may cause generation of foreign matter during the forming procedure. Also, when the content of the antioxidant is more than 1% by mass, the melt stability-enhancing effect of the antioxidant may be saturated.

More preferably, the content of the hindered phenolic antioxidants is in the range of 0.005 to 0.5% by mass. Also, the hindered phenolic antioxidants may be employed in combination with thioether compound secondary antioxidants. There is no specific limitation to the method of mixing the antioxidants with the polyester resin composition. The antioxidant may be contained in the polyester resin composite at any stages in the above-mentioned production procedure of the aromatic polyester polymer or the production procedure of the polyester resin composition which procedure will be explained hereinafter, for example, at a stage at which a tinting agent is imparted. Preferably, the antioxidant is mixed at least one stage of the production procedure of the aromatic polyester polymer, for example, at an appropriate stage after the transesterification reaction or the esterification reaction was completed but before the polymerization reaction is completed, into the reaction mixture.

In the production of the polyester resin composition of the present invention, the above-mentioned tinting agent is preferably added, at at least one stage of the production procedure of the aromatic polyester polymer, to a reaction mixture thereof. Among the stages at which the tinting agent is added, preferably, the addition of the tinting agent is carried out at appropriate stages until the polymerization reaction is completed, more preferably after the transesterification or the esterification reaction is completed, and the tinting agent is mixed into the resultant reaction mixture and then the tinting agent-containing reaction mixture is subjected to the polycondensation reaction. Otherwise, the tinting agent may be knead-mixed into the aromatic polyester polymer while the polymer is in the state of a melt.

In the production of the polyester resin composition of the present invention, preferably, a tinting agent comprising a mixture of a blue color-tinting coloring matter with a violet color-tinting coloring matter in a mass ratio in the range of from 90:10 to 40:60 is used, or a tinting agent comprising a mixture of a blue color-tinting coloring matter with a red or orange color-tinting coloring matter in a mass ratio in the range of from 98:2 to 80:20 is used. Here, the blue color-tinting coloring matters are referred to as trade-available coloring matters for tinting which are indicated in a color name of "blue". In concrete terms, the coloring matters having a maximum absorption wavelength of about 580 to 620 nm in a visible light spectrum measured in a solution of the coloring matter in a solvent are preferably employed. Also, the violet color-tinting coloring matters are referred to as trade-available coloring matters for tinting which are indicated in a color name of "violet". In concrete terms, the coloring matters having a maximum absorption wavelength of about 560 to 580 nm in a visible light spectrum measured in a solution of the coloring matter in a solvent are preferably employed. The red color-tinting coloring matters are referred to as trade-available coloring matters for tinting which are indicated in a color name of "red". In concrete terms, the coloring matters having a maximum absorption wavelength of about 480 to 520 nm in a visible light spectrum measured in a solution of the coloring matter in a solvent are preferably employed. Also, the orange color-tinting coloring matters are referred to as trade-available coloring matters for tinting which are indicated in a color name of "orange".

In the case where a blue color-tinting coloring matter is employed in combination with a violet color-tinting coloring matter, if the mass ratio. of the blue color-tinting coloring matter to the violet color-tinting coloring matter is more than 90:10, the resultant polyester resin composition has a decreased a* value and exhibits a greenish color tone. Also, the blue color-tinting coloring matter is used in a mass ratio less than 40:60, the resultant polyester resin composition may have a high a* value and exhibit a reddish color tone. Also, in the case where a blue color-tinting coloring matter is employed in combination with a red or orange color-tinting coloring matter, if the mass ratio of the blue color-tinting coloring matter to the combined coloring matter is more than 98:2, the resultant polyester resin composition has a decreased a* value and exhibits a greenish color tone, and if the mass ratio is less than 80:20, the a* value increases and the color of the resin composition becomes reddish.

More preferably, the tinting agent comprises a combination of a blue color-tinting coloring matter with a violet color-tinting coloring matter in a mass ratio in the range of from 80:20 to 50:50, or a combination of a blue color-tinting coloring matter with a red or orange color-tinting coloring matter in a mass ratio in the range of from 95:5 to 90:10.

The tinted polyester resin composition of the present invention can be formed into formation-processed products of the tinted polyester resin composition having a desired form and dimensions. The formation-processed products include fiber articles, film articles and other shaped articles, for example, bottle articles and injection-molded articles.

There is no specific limitation to the process for producing the fiber articles from the polyester resin composition of the present invention, and a conventional melt-spinning process can be utilized. For example, preferably a dried polyester resin composition is melt-spun at a temperature of 270 to 300° C., and the resultant melt-spun filaments are taken up at a speed of 400 to 5000 m/minute. When the melt-spinning speed is within the above-mentioned range, the resultant filaments have a satisfactory mechanical strength and can be wound up with a high stability. There is no specific limitation to the form of the melt-spinning orifices, and the orifices may have a circular, irregular, non-hollow or hollow forms. Also, the undrawn filaments produced in the above-mentioned melt-spinning step are drawn. The drawing procedure may be applied to the undrawn filaments after the filaments are wound up. Otherwise, the melt-spinning and drawing procedures may be continuously carried out without winding the undrawn filaments. Further, to improve the hand of the polyester fiber articles of the present invention, and alkali-treatment may be applied to the polyester fiber articles.

There is no specific limitation to the process for producing the polyester film articles of the present invention, and the film articles can be produced by conventional melt film-forming processes. For example, a dried tinted polyester resin composition is melted at a temperature in the range of from 270° C. to 300° C., extruded into a film form, and cooled on a cooling drum to prepare an undrawn film.

Then the undrawn film is biaxially drawn, heat-set, and optionally heat-relaxed. In this case, the properties of the film articles, for example, surface properties, density and thermal shrinkage, vary in response to the process conditions, for example, drawing conditions, etc. Therefore, the process conditions should be appropriately established.

The formation-processed articles of the polyester resin composition of the present invention include bottle articles and other injection-molded articles. There is no specific limitation to the process for producing the formation-processed articles, and these articles may be produced by conventional melt-forming process. For example, a dried tinted polyester resin composition is melted at a temperature of 270° C. to 300° C., and the melt of the polyester resin composition is poured into a mold at a temperature of 0 to 80° C., to form molded articles.

In the production of the bottle articles, preferably a bottle preform is formed from the resin composition melt by using a mold for forming bottles and, then, the resultant preform is formed into a bottle form by using a blow forming machine. In this connection, the bottle articles include not only bottles but also bottle preforms.

EXAMPLES

The present invention will be illustrated by the following examples which are not intended to restrict the scope of the present invention in any way. In the examples, intrinsic viscosity, color, titanium content, the height of adhered accumulation layers generated around the spinning orifices, etc. were determined by the following measurements.

(1) Intrinsic Viscosity

Chips of a polyester resin composition were dissolved in ortho-chlorophenol by a dissolving operation at a temperature of 100° C. for 60 minutes. The intrinsic viscosity of the polyester resin composition was calculated from a viscosity value of the diluted solution measured at a temperature of 35° C. by using the Ubbelohde viscometer.

(2) Content of Diethyleneglycol

Chips of a polyester resin composition were decomposed with hydrazine hydrate, and the content of diethyleneglycol contained in the resultant decomposition product was determined by using a gas chromatography (model: HP6850, made by Hewlett-Packard).

(3) Color (L* Value, a* Value and b* Value)

In the Case of Chips:

The chips of polyester resin composition were melted at a temperature of 285° C. under vacuum for 10 minutes and the resultant melt was formed, on an aluminum plate, into a plate having a thickness of 3.0±1.0 mm, the resultant plate was rapidly cooled in ice water, and then the plate was subjected to a drying-crystallization treatment at 140° C. for 2 hours. Thereafter, the resultant plate was placed on a white standard plate for differential colorimeter adjustment, and then the L* value and b* value of the plate surface was measured in accordance with JIS Z 8729, by using a Hunter differential colorimeter (model: CR-200) made by Minolta K.K. The L* value represent a lightness of the color, and the larger the L* value, the higher the color lightness. The b* value represents a degree of discoloration of the polyester resin composition with yellowish color, which degree increases with increase in the b* value.

In the Case of Fibers:

Four tabular knitted fabrics were prepared from the fibers, and superimposed on each other. The L* value and the b* value of the superimposed fabrics were measured in the same manner as mentioned above.

(4) Qualitative Analysis of Metal Components Having a True Specific Gravity of 5.0 or More A sample of a polyester resin composition was mixed with ammonium sulfate, sulfuric acid, nitric acid and perchloric acid and subjected to a wet decomposition treatment at approximately 300° C. for 9 hours. The resultant decomposition liquid was diluted with water and then subjected to a qualitative analysis using a ICP emission analysis apparatus (JY170, ULTRACE) made by RIGAKU DENKIKOGYO K.K., to confirm whether or not the metal elements having a true specific gravity of 5.0 or more were contained in the sample. With respect to the metal elements which were confirmed to be contained in contents of 1 ppm by mass or more, the contents of the metal elements were recorded.

(5) Contents of Polyester-soluble Titanium, Aluminum, Antimony, Manganese, Germanium, Cobalt and Phosphorus To determine the amounts of titanium element, aluminum element, antimony element, manganese element, germanium element, cobalt element and phosphorus element each soluble in a polyester contained in the polyester resin composition, a sample in the form of particles of the polyester resin composition was heat-melted on a steel plate and specimens having a flat smooth surface was formed from the melt by suing a compressive press. The specimens were supplied to a fluorescent X-ray tester (model: ZSX 100e, made by RIGAKU DENKIKOGYO K.K.), to determine the contents of the above-mentioned elements. In the case where the polyester resin composition contained titanium element derived from titanium dioxide added, as a delustering agent, to the polyester resin composition, a sample of the polyester resin composition was dissolved in ortho-chlorophenol, then an extraction treatment with a 0.5N hydrochloric acid was applied to the dissolved polyester resin composition, the resultant extraction liquid was subjected to a quantitative analysis using an electron spectrophotometer, model Z-8100, made by K.K. HITACHI SEISAKUSHO. When a dispersion of titanium dioxide in the extraction liquid prepared by the 0.5N hydrochloric acid extraction was observed, the dispersed titanium dioxide particles were deposited by using a centrifugal separator, only the resultant clear supernatant liquid was recovered by an inclination method, the recovered liquid was subjected to the same measurement as mentioned above. By these testing operations, even when the polyester resin composition contained titanium dioxide derived from the delustering agent, the content of the titanium element derived from the polyester-soluble titanium compounds can be quantitatively determined.

(6) Height of Adhered Layers Formed Around Melt-spinning Orifices

The polyester resin composition for the testing was formed into chips, the chips were melted and extruded through a melt-spinneret having 12 orifices each having a hole diameter of 0.15 mm. The melt-spinning procedure was contained at a taking-up speed of 600 m/minute for two days, the height of adhered layers formed around the outside edges of the orifices of the melt-spinneret was measured. The occurrences of bending of the filamentary streams of the extruded melt of the polyester resin component increases with increase in the height of the adhered layer. Also, the greater the height of the adhered layer, the lower the formability of the polyester resin composition. Namely, the height of the adhered layer generated on the melt-spinneret is an indicator of the formability of the polyester resin composition.

(7) Haze

In the Case of Bottle Preform:

A testing sample was taken from a middle portion of a body portion of a preform in the longitudinal direction of the preform sampled from preforms produced after the first five shots in the injection molting procedure. The haze of the taken portion of the preform sample was measured by a haze meter (model: HDH-1001DP) made by NIHON DENSHOKUKO-GYO K.K.

In the Case of Film:

A sheet of the polyester resin composition prepared by melt-extruding the resin composition onto a rotating cooling drum through a melt-extruder was rapidly cool-solidified to provide an undrawn film (sheet) having a thickness of 500 μm. The haze of the film was measured by using a haze meter (model: HDH 1001DP) made by NIHON DESHOKUKO-GYO K.K.

(8) Mass Reduction-initiating Temperature of Tinting Agent

A sample of the tinting agent was heated at a temperature-increasing rate of 10° C./minute in a nitrogen gas atmosphere and the mass reduction-initiating temperature of the sample was measured by using a thermobalance (model: TAS-200) made by RIGAKU DENKIKOGYO K.K., in accordance with JIS K 7120.

Referential Example 1

Synthesis of Titanium Catalyst A

A solution of 0.2% by mass of trimellitic anhydride in ethylene glycol was mixed with tetra-n-butoxytitanium in an amount of ½ mole per mole of trimellitic anhydride. The mixture was subjected to a reaction for 60 minutes by keeping it at a temperature of 80° C. in the air atmosphere under the ambient atmospheric pressure. Then the resultant reaction mixture was cooled to room temperature, and the resultant catalyst was recrystallized with acetone in an amount of ten times the reaction mixture. The resultant precipitation was collected by filtration with a filtering paper, and dried at 100° C. for 2 hours, to obtain the desired compound. The resultant compound will be referred to as titanium catalyst A hereinafter.

Referential Example 2

Synthesis of Titanium Catalyst B

Mono-n-butyl phosphate in an amount of 3.5 parts by mass was dissolved in 131 parts by mass of ethylene glycol by heating the mixture thereof at 120° C. for 10 minutes. The resultant ethylene glycol solution in an amount of 134.5 parts by mass was further mixed with 40 parts by mass of ethyleneglycol and in the resultant solution, 3.8 parts by mass of tetra-n-butoxytitanium were dissolved. The resultant reaction mixture liquid was stirred at 120° C. for 60 minutes to react the titanium compound with mono-n-butyl phosphate. A white aqueous slurry of a catalyst containing the resultant reaction product was obtained. In the catalyst slurry, the titanium content was 0.3% by mass and the molar ratio $M_P/M_{Ti}$ of the phosphorus element to the titanium element was 2.0. As a result of further detailed analysis, it was confirmed that the catalyst in the white slurry was a compound represented by the general formula (III) wherein X represents a n-butyl group. This catalyst will be referred to as titanium catalyst B hereinafter.

Referential Example 3

Measurement of Visible Light Absorption Spectrum of Tinting Agent
Preparation of Tinting Agents
A solution of each coloring matter shown in Table 1 in chloroform was prepared in a concentration of 20 mg/liter at room temperature, and a quartz cell having an optical path length of 1 cm was filled with the solution. A reference cell was filled with chloroform alone. The cell and the reference cell were subjected to a measurement of visible light absorption spectra in a visible light wavelength band of from 380 to 780 nm by using a spectrophotometer, model: U-3010, made by K.K. Hitachi Seisakusho. In the case where two tinting agents are used in mixture thereof, the total concentration was adjusted to 20 mg/liter. The ratio of an absorbance of each solution at a wavelength of 400, 500, 600 or 700 nm to an absorbance of each solution at a maximum absorption wavelength was calculated. Also, the thermal mass reduction-initiating temperature of each tinting agent in the form of a powder was measured. The measurement results are shown in Table 1.

In the examples and comparative examples, in which the tinting agent was added to the polyester polymer during the production procedure of the polyester polymer, the tinting agent was dissolved or dispersed in a concentration of 0.1% by mass in a glycol solution used as a starting material at a temperature of 100° C.

reaction. The mixture in the reactor was subjected to an esterification reaction under a pressure of 0.07 MPa while increasing the temperature of the reaction mixture from 140° C. to 240° C., then 0.023 part by mass of triethyl phosphonoacetate was added to the reaction mixture, and the reaction was mixed into the resultant reaction product, 0.2 part by mass of an ethylene glycol solution of 0.1% by mass of the tinting agent (A) as shown in Table 1 was mixed. The resultant reaction mixture was placed in a polymerization reactor and subjected to a polycondensation reaction by increasing the temperature of the reaction mixture to 290° C. under a high vacuum of 30 Pa or less. A tinted polyester resin composition having an intrinsic viscosity of 0.63 and a diethyleneglycol content of 1.3% by mass was obtained. The tinted polyester resin composition was formed into chips.

The test results are shown in Tables 2 and 3.

(2) Production of Polyester Fibers
The tinted polyester resin composition chips were dried at 160° C. for 4 hours and then subjected to a melt-spinning procedure at a melt-spinning temperature of 285° C., at a taking-up speed of 400 m/minute, to produce undrawn filament yarn having a yarn count of 333 Dtex/36 filaments. The undrawn filament yarn was drawn at a draw ratio of 4.0 to produce a drawn filament yarn having a yarn count of 83.25 dtex/36 filaments. A tubular knitted fabric was produced from the drawn filament yarn. The test results are shown in Table 4.

(3) Production of Polyester Film
The tinted polyester resin composition chips were dried at 160° C. for 4 hours, and melted at 285° C. The melt was extruded onto a rotating casting drum to form a sheet. In this case, the casting drum surface had a temperature of 30° C. immediately before the extruded melt was casted thereon, and then the surface temperature was gradually increased to 40° C. Also, an electrode in the form of a wire was arranged in contact with a surface of the melt sheet casted on the casting

TABLE 1

| Type of tinting agent | | | Mixing Ratio | Maximum absorption wavelength nm | Absorbance ratio*[1] | | | | Mass reduction-initiating temperature (° C.) |
|---|---|---|---|---|---|---|---|---|---|
| | | | | | 400 nm | 500 nm | 600 nm | 700 nm | |
| Tinting agent | A | C.I. Solvent Blue 45 ("POLYSYNTHRENE BLUE RLS") (made by Clariant Japan) | PLAST VIOLET 8855-T ("C.I. Solvent Violet 36")*[2] | 60:40 | 580 | 0.10 | 0.41 | 0.76 | 0.00 | 360 |
| | B | C.I. Solvent Blue 45 ("POLYSYNTHRENE BLUE RLS") (made by Clariant Japan) | C.I. Solvent Red 52*[2] | 80:20 | 580 | 0.12 | 0.35 | 0.78 | 0.00 | 380 |
| | C | C.I. Solvent Red 52*[2] | — | 100:0 | 580 | 0.28 | 0.93 | 0.03 | 0.00 | 440 |
| | D | C.I. Solvent Green 20*[2] | — | 100:0 | 685 | 0.25 | 0.06 | 0.48 | 0.98 | 400 |

*[1]Ratio of absorbance at each specified wavelength to absorbance at maximum absorption wavelength
*[2]Made by ARIMOTO KAGAKU K.K.

Example 1

(1) Preparation of Polyester Resin Composition Chips
A mixture of 100 parts by mass of dimethyl terephthalate with 70 parts by mass of ethylene glycol and 0.016 part by mass of the titanium catalyst A prepared in Referential Example 1 were charged in a SUS reactor for high pressure drum, opposite to the surface of the melt sheet in contact with the casting drum surface, immediate after the melt was casted on the casting drum. Using the electrode, the sheet of the polyester resin composition was statically charged to cause the sheet to be closely contact with the casting drum. As a result, an undrawn polyester film having a thickness of 500 μm was obtained. The test results are shown in Table 4.

(4) Production of Polyester Resin-molded Article (Production of Bottle Preform)

The tinted polyester resin composition chips were dried and crystallized at 160° C. for 4 hours and then placed in a packed column type solid phase polymerization column. The dried chips were subjected to a solid phase polycondensation reaction in a nitrogen gas stream at 215° C. The intrinsic viscosity of the chips was adjusted to 0.76 by controlling the polymerization time. The solid phase polymerized chips were injection-molded by an injection molding machine at a cylinder temperature of 275° C. at a screw revolution number of 160 rpm, in a primary pressurizing time of 3.0 seconds at a mold-cooling temperature of 10° C., at a cycling time of 30 seconds. A cylindrical perform having an outside diameter of about 28 mm, an inside diameter of 19 mm, a length of 136 mm, a body wall thickness of 4 mm and a mass of about 56 g was obtained. The test results are shown in Table 4.

Example 2

By the same procedures as in Example 1, a tinted polyester resin composition was produced and then polyester fibers, a polyester film and a polyester bottle preform were produced from the tinted polyester resin composition with the following exceptions.

In the preparation of the tinted polyester resin composition, the type of tinting agent as shown in Table 2 was employed in an amount as shown in Table 2.

The test results are shown in Tables 3 and 4.

Example 3

By the same procedures as in Example 1, a tinted polyester resin composition was produced and then polyester fibers, a polyester film and a polyester bottle preform were produced from the tinted polyester resin composition with the following exceptions.

In the production of the polyester polymer, no triethyl phosphonoacetate was employed and the type and amount of the tinting agent were changed to as shown in Table 2.

The test results are shown in Tables 3 and 4.

Example 4

By the same procedures as in Example 1, a tinted polyester resin composition was produced and then polyester fibers, a polyester film and a polyester bottle preform were produced from the tinted polyester resin composition with the following exceptions.

The tinted polyester resin composition was produced by the following procedures.

In a reactor which contained a polyester oligomer in an amount of 225 parts by mass, a slurry prepared by mixing 179 parts by mass of a high purity terephthalic acid and 95 parts by mass of ethylene glycol, a nitrogen gas, under conditions maintained at 255° C. under ambient atmospheric pressure, was fed at a constant supply rate. An esterification reaction was carried out for 4 hours, while water produced by the reaction and ethylene glycol were removed from the reaction system by distillation, until the reaction was completed. In this reaction, the degree of esterification was 98% or more, and the degree of polymerization of the resultant oligomer was approximately 5 to 7.

The oligomer produced by the above-mentioned esterification reaction was placed in an amount of 225 parts by mass in a polycondensation reaction vessel. The oligomer in the reaction vessel was mixed with 1.5 parts by mass of the titanium catalyst B prepared in Referential Example 2 and 0.32 part by mass of the a solution containing 0.1% by mass of the tinting agent (A) as shown in Table 1, dissolved in ethylene glycol. Subsequently, the reaction temperature in the reaction system was increased stepwise from 255° C. to 290° C. and the reaction pressure in the reaction system was reduced stepwise from the ambient atmospheric pressure to a pressure of 30 Pa, to effect a polycondensation reaction, while removing water generated by the reaction and ethylene glycol from the reaction system to the outside thereof. As a result of the reaction, a tinted polyester resin composition having an intrinsic viscosity of 0.63 and a diethylene glycol content of 1.3% by mass, was obtained. The polyester resin composition was formed into chips. The test results of the chips are shown in Table 3. Also, the test results of the shaped articles produced from the chips are shown in Table 4.

Example 5

By the same procedures as in Example 4, a tinted polyester resin composition was produced and then polyester fibers, a polyester film and a polyester bottle preform were produced from the tinted polyester resin composition by the same procedures as in Example 1, with the following exceptions.

In the preparation of the polyester polymer, the titanium catalyst B was replaced by the catalyst and the stabilizer as shown in Table 2. The test results are shown in Tables 3 and 4.

Example 6

By the same procedures as in Example 1, a tinted polyester resin composition was produced and then polyester fibers were produced from the tinted polyester resin composition with the following exceptions.

In the preparation of the polyester polymer, dimethyl terephthalate used as a starting material of the polycondensation was replaced by dimethyl 2,6-naphthalene dicarboxylate. The resultant polyester polymer had an intrinsic viscosity of 0.60 and a diethylene glycol content of 1.0% by mass.

The polyester film and the polyester bottle preform were not produced.

Example 7

By the same procedures as in Example 1, a tinted polyester resin composition was produced and then polyester fibers were produced from the tinted polyester resin composition with the following exceptions.

In the preparation of the polyester polymer, trimethylene glycol was employed in place of ethylene glycol and the polymerization temperature was charged from 290° C. to 265° C. Further, the titanium catalyst A was replaced by the catalyst as shown in Table 2. The resultant polyester polymer exhibited an intrinsic viscosity of 0.70.

Further, the melt-spinning temperature for the polyester fibers was changed from 285° C. to 260° C. No polyester film and no polyester bottle preform were produced.

The test results are shown in Tables 3 and 4.

Example 8

By the same procedures as in Example 1, a tinted polyester resin composition was produced and then polyester fibers were produced from the tinted polyester resin composition with the following exceptions.

In the starting materials, dimethyl terephthalate was replaced by dimethyl 2,6-naphthalene dicarboxylate, and ethylene glycol was replaced by trimethylene glycol. Also, the polymerization temperature was changed from 290° C. to 265° C., and the titanium catalyst A was replaced by the catalyst as shown in Table 2. The resultant polyester polymer had an intrinsic viscosity of 0.65.

In the production of the polyester fibers, the melt-spinning temperature was changed from 285° C. to 260° C. No polyester film and no polyester bottle preform were produced.

The test results are shown in Tables 3 and 4.

Example 9

By the same procedures as in Example 1, a tinted polyester resin composition was produced and then polyester fibers were produced from the tinted polyester resin composition with the following exceptions.

As a staring material, tetramethylene glycol was employed in place of ethylene glycol. The polymerization temperature was changed from 290° C. to 255° C. Also, the titanium catalyst A was replaced by the catalyst as shown in Table 2. The resultant polyester polymer exhibited an intrinsic viscosity of 0.70.

In the production of the polyester fibers, the melt-spinning temperature was changed from 285° C. to 260° C. No polyester film and no polyester bottle preform were produced.

The test results are shown in Tables 3 and 4.

Example 10

By the same procedures as in Example 1, a tinted polyester resin composition was produced and then polyester fibers were produced from the tinted polyester resin composition with the following exceptions.

In the staring materials, dimethyl 2,6-naphthalene dicarboxylate was employed in place of dimethyl terephthalate, and tetramethylene glycol was used in place of ethylene glycol. The polymerization temperature was changed from 290° C. to 265° C., and the titanium catalyst A was replaced by the catalyst as shown in Table 2. The resultant polyester polymer had an intrinsic viscosity of 0.65.

In the production of the polyester fibers, the melt-spinning temperature was changed from 280° C. to 260° C. No polyester film and no polyester bottle preform were produced.

The test results are shown in Tables 3 and 4.

Comparative Example 1

By the same procedures as in Example 1, a tinted polyester resin composition was produced and then polyester fibers, a polyester film and a polyester bottle preform were produced from the polyester resin composition with the following exceptions.

The titanium catalyst A was replaced by the catalyst as shown in Table 2. No tinting agent was contained in the polymer resin.

The test results are shown in Tables 3 and 4.

Comparative Examples 2 to 4

In each of Comparative Examples 2 to 4, by the same procedures as in Example 1, a tinted polyester resin composition was produced and then polyester fibers, a polyester film and a polyester bottle preform were produced from the tinted polyester resin composition with the following exceptions.

The type and amount of the tinting agent were changed to as shown in Table 2.

The test results are shown in Tables 3 and 4.

Comparative Example 5

By the same procedures as in Example 1, polyester fibers, a polyester film and a polyester bottle preform were produced from a tinted polyester resin composition with the following exceptions.

The tinted polyester resin composition was prepared by the following procedures.

A mixture of 100 parts by mass of dimethyl terephthalate with 70 parts by mass of ethylene glycol, and 0.032 part by mass of manganese acetate tetrahydrate were charged in a reactor equipped with a stirrer, a fractionating column and methyl alcohol-distillation condenser. The temperature of the reaction mixture in the reactor was gradually increased from 140° C. to 240° C., to effect a transesterification reaction, while distilling and discharging methyl alcohol produced as a result of the reaction to the outside of the reactor. To the reaction mixture liquid, 0.02 part by mass of trimethyl phosphate was added and the transesterification reaction was ended.

The resultant reaction product was transferred from the reactor to a reaction vessel equipped with a stirrer, a nitrogen gas inlet, a pressure-reduction outlet and a distillation device. The reaction product was mixed with 0.045 part by mass of diantimony trioxide, and the mixture was heated to a temperature of 290° C. and subjected to a polycondensation reaction under a high vacuum of 30 Pa or less. A polyester resin containing no tinting agent was obtained. The same forming tests as in Example 1 were carried out. The test results are shown in Tables 3 and 4.

TABLE 2

| | | | Item | | | | | | |
|---|---|---|---|---|---|---|---|---|---|
| | | | Transesterification catalyst | | Polycondensation catalyst | | Phosphorus compound | | Tinting agent |
| | Dicarboxylic | | | | | | | | Amount added |
| Example No. | acid component | Glycol component | Type | Amount (mmol %) | Type | Amount (mmol %) | Type | Amount (mmol %) | Type | (Content) (ppm by mass) |
| Example 1 | DMT | EG | Titanium catalyst A | 5 | Titanium catalyst A | | TEPA | 20 | Tinting agent A | 2 |
| 2 | DMT | EG | Titanium catalyst A | 5 | Titanium catalyst A | | TEPA | 20 | Tinting agent B | 2 |
| 3 | DMT | EG | Titanium catalyst A | 5 | Titanium catalyst A | | — | — | Tinting agent A | 5 |

TABLE 2-continued

| | | | | Transesterification catalyst | | Polycondensation catalyst | | Phosphorus compound | | Tinting agent | |
|---|---|---|---|---|---|---|---|---|---|---|---|
| Example No. | | Dicarboxylic acid component | Glycol component | Type | Amount (mmol %) | Type | Amount (mmol %) | Type | Amount (mmol %) | Type | Amount added (Content) (ppm by mass) |
| | 4 | DMT | EG | — | — | Titanium catalyst B | 7 | — | — | Tinting agent A | 1.5 |
| | 5 | DMT | EG | — | — | ALAA/LIA | 15/10 | — | — | Tinting agent A | 3 |
| | 6 | DMN | EG | Titanium catalyst A | 5 | Titanium catalyst A | 5 | TEPA | 20 | Tinting agent A | 2 |
| | 7 | DMT | TRMG | TBT | 30 | TBT | | — | — | Tinting agent A | 2 |
| | 8 | DMN | TRMG | TBT | 30 | TBT | | — | — | Tinting agent A | 2 |
| | 9 | DMT | TEMG | TBT | 40 | TBT | | — | — | Tinting agent A | 2 |
| | 10 | DMN | TEMG | TBT | 40 | TBT | | — | — | Tinting agent A | 2 |
| Comparative Example | 1 | DMT | EG | Titanium catalyst A | 5 | Titanium catalyst A | | — | — | — | — |
| | 2 | DMT | EG | Titanium catalyst A | 5 | Titanium catalyst A | | TEPA | 20 | Tinting agent C | 2 |
| | 3 | DMT | EG | Titanium catalyst A | 5 | Titanium catalyst A | | TEPA | 20 | Tinting agent D | 2 |
| | 4 | DMT | EG | Titanium catalyst A | 5 | Titanium catalyst A | | TEPA | 20 | Tinting agent A | 12 |
| | 5 | DMT | EG | MNA | 25 | SBO | 30 | TMP | 28 | — | — |

TABLE 3

| | | Intrinsic viscosity | DEG (wt %) | Color | | | Element contained (mmol %) | | | | | Qualititative analysis result of metal components with a true specific gravity of 5.0 or more | $M_P/M_{Ti}$ ratio |
|---|---|---|---|---|---|---|---|---|---|---|---|---|---|
| Example No. | | | | L* | a* | b* | Ti* | P$ | Al | Sb | Mn | | |
| Example | 1 | 0.63 | 1.3 | 80.0 | −6.7 | 1.9 | 5 | 15 | 0 | 0 | 0 | Not detected | 3.0 |
| | 2 | 0.63 | 1.3 | 79.5 | −6.8 | 2.1 | 5 | 14 | 0 | 0 | 0 | Not detected | 2.8 |
| | 3 | 0.63 | 1.3 | 73.0 | −6.6 | 2.1 | 5 | 0 | 0 | 0 | 0 | Not detected | 0 |
| | 4 | 0.63 | 1.3 | 80.5 | −7.0 | 1.0 | 7 | 14 | 0 | 0 | 0 | Not detected | 2.0 |
| | 5 | 0.63 | 1.3 | 79.0 | −6.4 | 2.0 | 0 | 0 | 15 | 0 | 0 | Not detected | — |
| | 6 | 0.60 | 1.0 | 73.0 | −5.5 | 2.7 | 5 | 16 | 0 | 0 | 0 | Not detected | 3.2 |
| | 7 | 0.70 | — | 81.2 | −7.1 | 3.0 | 29 | 0 | 0 | 0 | 0 | Not detected | 0 |
| | 8 | 0.65 | — | 75.0 | −6.6 | 2.6 | 29 | 0 | 0 | 0 | 0 | Not detected | 0 |
| | 9 | 0.70 | — | 80.1 | −7.2 | −1.0 | 40 | 0 | 0 | 0 | 0 | Not detected | 0 |
| | 10 | 0.65 | — | 76.2 | −6.6 | 0.2 | 39 | 0 | 0 | 0 | 0 | Not detected | 0 |
| Comparative Example | 1 | 0.63 | 1.3 | 81.5 | −6.7 | 11.5 | 5 | 0 | 0 | 0 | 0 | Not detected | 0 |
| | 2 | 0.63 | 1.3 | 80.1 | 4.0 | 2.1 | 5 | 14 | 0 | 0 | 0 | Not detected | 2.8 |
| | 3 | 0.63 | 1.3 | 80.7 | −11.3 | 3.5 | 5 | 14 | 0 | 0 | 0 | Not detected | 2.8 |
| | 4 | 0.63 | 1.3 | 63.5 | −3.5 | −8.6 | 5 | 15 | 0 | 0 | 0 | Not detected | 3.0 |
| | 5 | 0.63 | 0.7 | 73.5 | −6.5 | 2.0 | 0 | 25 | 0 | 330& | 71& | Mn, Sb | — |

TABLE 4

| | | Evaluation of polyester fibers | | | | Polyester film | Polyester bottle preform |
|---|---|---|---|---|---|---|---|
| | | Height of foreign matter accumulation | Color | | | | |
| Example No. | | on spinneret (μm) | L* | a* | b* | Haze (%) | Haze (%) |
| Example | 1 | 3 | 95.2 | −0.8 | 2.0 | 0.4 | 1.2 |
| | 2 | 4 | 95.3 | −0.7 | 2.1 | 0.5 | 1.2 |
| | 3 | 3 | 92.0 | −0.8 | 2.2 | 0.5 | 1.5 |

TABLE 4-continued

|  |  | Evaluation of polyester fibers | | | | Polyester film | Polyester bottle preform |
|---|---|---|---|---|---|---|---|
|  |  | Height of foreign matter accumulation | Color | | | | |
| Example No. | | on spinneret (μm) | L* | a* | b* | Haze (%) | Haze (%) |
|  | 4 | 3 | 95.5 | −0.8 | 1.2 | 0.4 | 1.3 |
|  | 5 | 5 | 94.8 | −0.7 | 2.1 | 0.5 | 1.5 |
|  | 6 | 3 | 91.8 | −0.6 | 2.6 | — | — |
|  | 7 | 6 | 93.3 | −1.1 | 2.8 | — | — |
|  | 8 | 3 | 92.1 | −1.0 | 2.5 | — | — |
|  | 9 | 4 | 93.2 | −0.9 | −1.1 | — | — |
|  | 10 | 3 | 92.1 | −0.8 | 0.1 | — | — |
| Comparative Example | 1 | 3 | 95.5 | −0.7 | 10.4 | 0.3 | 1.3 |
|  | 2 | 4 | 94.8 | 2.8 | 2.2 | 0.3 | 1.2 |
|  | 3 | 3 | 95.1 | −6.5 | 3.6 | 0.4 | 1.4 |
|  | 4 | 3 | 86.4 | −0.2 | −7.6 | 0.6 | 2.1 |
|  | 5 | 55 | 92.1 | −0.8 | 2.1 | 2.1 | 7.2 |

Notes of Table 2
  DMT: Dimethyl terephthalate
  DMN: Dimethyl 2,6-naphthalene dicarboxylate
  EG: Ethylene glycol
  TRMG: Trimethylene glycol
  TEMG: Tetramethylene glycol
  TBT: Tetra-n-butoxytitanium
  MNA: Manganese acetate tetrahydrate
  ALAA: Aluminum acetylacetonate
  LIA: Lithium acetate
  SBO: Diantimony trioxide
  TEPA: Triethyl phosphonoacetate
  TMP: Trimethyl phosphate
  The amounts of transesterification catalyst, polycondensation catalyst and phosphorus compound were respectively based on the molar amount of DMT or DMN.

Notes of Table 3
  DEG: Diethylene glycol
  Color value (L*, a* and b* values) of polyester resin composition was determined after the resin composition chips were heat-treated at 140° C. for two hours.
  Ti*: Titanium element derived from a polyester-soluble titanium compound contained in the polyester resin component.
  P$: Phosphorus element contained in the polyester resin composition
  The contents of Al, Sb and Mn elements are in units of ppm by mass.
  Ratio $M_p/M_{Ti}$: A molar ratio of phosphorus element to titanium element contained in the catalyst in the aromatic polyester polymer.
  The concentrations in m mole % of elements contained in the polyester polymer is determined per mole of the repeating units of the aromatic polyester polymer.
  Table 3 shows that the tinted polyester resin compositions of Examples 1 to 10 according to the present invention had satisfactory compositions and color values (L*, a* and b*) in practice, satisfactory fiber-forming property, film-forming property and injunction moldability in practice and satisfactory performances for practice. Compared with them, the polyester resin compositions of Comparative Examples 1 to 4 were insufficient in color (L*, a* and b*) and formability. Also, in Comparative Example 5, the antimony compound was employed as a catalyst and thus the resultant resin containing no tinting agent had an satisfactory color. However, the resin contained a large amount of residual antimony and was unsatisfactory in the melt-spinning property.

Example 11

(1) Preparation of Polyester Resin Composition Chips

A mixture of 100 parts by mass of dimethyl terephthalate with 70 parts by mass of ethylene glycol and, as a transesterification catalyst, 0.032 part by mass of manganese acetate tetrahydrate were charged in a reactor equipped with a stirrer, a fractionating column and a methyl alcohol-distillation condenser. The resultant reaction mixture was gradually heated from 140° C. to 240° C. to cause a transesterification reaction to be carried out, while distill-removing methyl alcohol generated as a result of the reaction to the outside of the reactor. The resultant reaction mixture liquid was mixed with 0.02 part by mass of trimethyl phosphate and the transesterification reaction was ended. The resultant reaction product was mixed with 0.3 parts by mass of an ethylene glycol solution of 0.1% by mass of the tinting agent A as shown in Table 1, 1.5 parts by mass of an ethylene glycol slurry containing 0.037 part by mass of diantimony trioxide (a polycondensation catalyst), and 20% by mass of titanium dioxide. The resultant reaction mixture was placed in a reaction vessel equipped with a stirrer, a nitrogen gas-introduction inlet, a pressure reduction outlet and a distillation device. The temperature of the content in the reaction vessel was increased to 300° C., to effect a polycondensation reaction under a high vacuum of 30 Pa or less. As a result, a tinted polyester resin composition, having an intrinsic viscosity of 0.73 and a diethylene glycol content of 0.7% by mass, was obtained. The polyester resin composition was formed into chips. Table 5 shows the starting materials, the catalyst and the additives of the tinted polyester resin composition and Table 6 shows the test results thereof.

(2) Production of Polyester Fibers

The above-mentioned chips were dried at a temperature of 160° C. for 4 hours, and the dried chips were subjected to a melt-spinning procedure under the conditions of a temperature of 295° C. and a winding speed of 400 m/minute, to prepare an undrawn filament yarn having a yarn count of 333 dtex/36 filaments. The undrawn filament yarn was drawn at a drawn ratio of 4.0, to prepare a drawn filament yarn having 83.25 dtex/36 filament. A tubular knitted fabric produced from the drawn filament yarn was subjected to the tests. The test results are shown in Table 6.

Examples 12 and 13

In each of Examples 12 and 13, a tinted polyester resin composition was produced and then polyester fibers were produced from the polyester resin composition by the same procedures as in Example 11 with the following exceptions.

In Example 12, the tinting agent A was replaced by the tinting agent B as shown in Table 1, and in Example 13, the tinting agent was employed in an amount of 5 ppm by mass in place of 3 ppm by mass.

Example 14

By the same procedures as in Example 11, a tinted polyester resin composition was produced and then polyester fibers were produced from the polyester resin composition with the following exception.

As a polycondensation catalyst, germanium dioxide (GEO) was employed in the amount as shown in Table 5, in place of diantimony trioxide (SBO). The test results are shown in Table 6.

Example 15

By the same procedures as in Example 11, a tinted polyester resin composition was produced and then polyester fibers were produced from the polyester resin composition with the following exceptions.

As shown in Table 5, dimethyl 2,6-naphthalene dicarboxylate was employed as a starting compound in place of dimethyl terephthalate. The resultant polyester polymer had an intrinsic viscosity of 0.69 and a diethylene glycol content of 0.6% by mass.

The test results are shown in Table 6.

Comparative Example 6

By the same procedures as in Example 11, a tinted polyester resin composition was produced and then polyester fibers were produced from the polyester resin composition with the following exceptions.

No tinting agent was employed.

The test results are shown in Table 6.

Comparative Examples 7 to 9

In each of Comparative Examples 7 to 9, by the same procedures as in Example 11, a tinted polyester resin composition was produced and then polyester fibers were produced from the polyester resin composition with the following exceptions.

The tinting agent (A) and the amount of the tinting agent were changed to as shown in Table 5.

The test results are shown in Table 6.

Example 10

By the same procedures as in Example 11, a tinted polyester resin composition was produced and then polyester fibers were produced from the polyester resin composition with the following exceptions.

No tinting agent was employed and cobalt acetate tetrahydrate was added in the amount as shown in Table 5.

The test results are shown in Table 6.

TABLE 5

| | | | Transesterification catalyst | | Polycondensation catalyst | | Phosphorus compound | | Titanium dioxide | Cobalt acetate | Tinting agent | |
|---|---|---|---|---|---|---|---|---|---|---|---|---|
| Example No. | | Dicarboxylic acid component | Type | Amount (mmol %) | Type | Amount (mmol %) | Type | Amount (mmol %) | Amount (% by mass) | Amount (mmol %) | Type | Amount (Content) (ppm by mass) |
| Example | 11 | DMT | MNA | 25 | SBO | 25 | TMP | 28 | 0.3 | — | Tinting agent A | 3 |
| | 12 | DMT | MNA | 25 | SBO | 25 | TMP | 28 | 0.3 | — | Tinting agent B | 3 |
| | 13 | DMT | MNA | 25 | SBO | 25 | TMP | 28 | 0.3 | — | Tinting agent A | 5 |
| | 14 | DMT | MNA | 25 | GEO | 40 | TMP | 28 | 0.3 | — | Tinting agent A | 3 |
| | 15 | DMN | MNA | 25 | SBO | 25 | TMP | 28 | 0.3 | — | Tinting agent A | 3 |
| Comparative Example | 6 | DMT | MNA | 25 | SBO | 25 | TMP | 28 | 0.3 | — | — | — |
| | 7 | DMT | MNA | 25 | SBO | 25 | TMP | 28 | 0.3 | — | Tinting agent C | 3 |
| | 8 | DMT | MNA | 25 | SBO | 25 | TMP | 28 | 0.3 | — | Tinting agent D | 3 |
| | 9 | DMT | MNA | 25 | SBO | 25 | TMP | 28 | 0.3 | — | Tinting agent A | 12 |
| | 10 | DMT | MNA | 25 | SBO | 25 | TMP | 28 | 0.3 | 10 | — | — |

TABLE 6

| | | | | | | | | Content of element (ppm by mass) | | | | Fibers Color | | |
|---|---|---|---|---|---|---|---|---|---|---|---|---|---|---|
| | | Intrinsic | DEG | Color | | | | | | | | | | |
| Example No. | | viscosity | (wt %) | L* | a* | b* | Sb | Ge | Co | Ti* | L* | a* | b* |
| Exam- | 11 | 0.73 | 0.7 | 70.2 | −5.2 | 6.5 | 245 | 0 | 0 | 1 or less | 90.1 | −0.8 | 5.7 |
| ple | 12 | 0.73 | 0.7 | 68.5 | −5.4 | 6.8 | 248 | 0 | 0 | 1 or less | 89.8 | −0.9 | 6.0 |
| | 13 | 0.73 | 0.7 | 66.9 | −5.0 | 3.4 | 250 | 0 | 0 | 1 or less | 89.0 | −0.7 | 4.1 |
| | 14 | 0.73 | 0.7 | 73.3 | −5.7 | 6.4 | 0 | 81 | 0 | 1 or less | 91.3 | −1.0 | 5.8 |
| | 15 | 0.69 | 0.6 | 66.1 | −4.9 | 6.4 | 220 | 0 | 0 | 1 or less | 88.3 | −0.7 | 5.7 |
| Com- | 6 | 0.73 | 0.7 | 73.3 | −5.3 | 10.7 | 247 | 0 | 0 | 1 or less | 91.5 | −0.8 | 10.1 |
| parative | 7 | 0.73 | 0.7 | 70.4 | 5.1 | 6.6 | 250 | 0 | 0 | 1 or less | 90.5 | 3.2 | 5.9 |
| Exam- | 8 | 0.73 | 0.7 | 70.6 | −13.1 | 6.9 | 252 | 0 | 0 | 1 or less | 90.8 | −7.3 | 6.0 |
| ple | 9 | 0.73 | 0.7 | 57.7 | −3.3 | −7.0 | 246 | 0 | 0 | 1 or less | 84.4 | −0.4 | −6.8 |
| | 10 | 0.73 | 0.7 | 70.1 | −5.0 | 6.3 | 253 | 0 | 29 | 1 or less | 89.9 | −0.7 | 5.8 |

Notes of Table 5
  DMT: Dimethyl terephthalate
  DMN: Dimethyl 2,6-naphthalene dicarboxylate
  MNA: Manganese acetate tetrahydrate
  SBO: Diantimony trioxide
  GEO: Germanium dioxide
  TMP: Trimethyl phosphate Notes of Table 6
  DEG: Diethylene glycol
  Color L*, a* and b* values of the polyester resin composition chips were determined after the chips were heat-treated at 140° C. for 2 hours.
  Ti*: Content of titanium metal element derived from titanium compound contained in the polyester resin composition and soluble in the polyester. The Ti* value of 1 ppm by mass or less corresponds to the content of titanium metal element of $2 \times 10^{-3}\%$ or less, on the basis of the total molar amount of all the dicarboxylic acids contained, as a polyester-constituting component in the polyester resin composition.
  The contents of the transesterification catalyst, the polycondensation catalyst, phosphorus compound and cobalt acetate were calculated on the basis of the molar amount of DMT or DMN.

In Examples 11 to 15 according to the present invention, tinted polyester resin compositions having good performances and polyester fibers comprising the polyester resin composition were obtained.

The resin compositions of Comparative Examples 6 to 9 exhibited, when formed into chips and fibers, unsatisfactory color.

In Comparative Example 10, the addition of the cobalt compound caused the resultant polyester resin composition and fibers to exhibit excellent color. However, due to too high a content of cobalt, the resultant polyester resin composition chips and fibers were insufficient in bleachability thereof.

Example 16

A mixture of 100 parts by mass of dimethyl terephthalate with 70 parts by mass of ethylene glycol and 0.016 part by mass of the titanium catalyst A prepared in Referential Example 1 were charged in a SUS vessel usable for reaction under pressurized conditions. The content in the reaction vessel was heated from 140° C. to 240° C. under pressure of 0.07 MPa, to effect a transesterification reaction. After it was confirmed that methyl alcohol was distill-removed in the stoichiometric amount from the reaction mixture, the transesterification reaction wad ended.

Then the reaction product was transferred to a polymerization vessel, the content in the vessel was heated to a temperature of 290° C. to effect the polycondensation reaction under a high vacuum of 30 Pa or less, while tracing the melt viscosity of the reaction mixture, and at a stage at which the intrinsic viscosity of the resultant polyester polymer reached 0.65, the polymerization reaction was terminated. A polymer melt was extruded in strand form from the bottom of the reaction vessel into cooling water, the cooled polymer strand was cut by using a strand cutter to prepare the polyester polymer chips. The test results are shown in Table 7.

The resultant aromatic polyester polymer chips were dried at 160° C. for 4 hours and then fed into a two screw type extruder having a vent, in which extruder, a temperature of a kneading section was adjusted to 285° C., and in the kneading section the polymer chips were melted and mixed with the tinting agent, as shown in Table 7 in a residing time of 5 minutes. The tinted polymer was extruded in strand form into cooling water, the resultant polymer strand was cut by a strand cutter, to provide a polyester resin composition chips.

The test results are shown in Table 8.

Production of Polyester Fibers

The resultant polyester resin composition chips were dried at 160° C. for 4 hours, melt-spun at a melt-spinning temperature at 285° C. at a winding speed of 400 m/min., to provide undrawn filament yarn having a yarn count of 333 dtex/36 filaments, and then drawn at a draw ratio of 4.0 to produce a drawn filament yarn having a yarn count of 83.25 dtex/36 filaments. A tubular knitted fabric was produced from the drawn filament yarn.

The test results are shown in Table 9.

Comparative Example 11

The same procedures as in Example 16 were carried out, except that no tinting agent was mixed by melt-kneading.

The results are shown in Tables 7 to 9.

TABLE 7

| | Base polymer | | | Catalyst compound | | Phosphorus compound | | Tinting agent | |
|---|---|---|---|---|---|---|---|---|---|
| Example No. | Type | Intrinsic viscosity | DEG (WT %) | Type | Amount mmol % | Type | Amount mmol % | Type | Amount (Content) ppm by mass |
| Example 16 | PET | 0.65 | 1.3 | Titanium catalyst A | 5 | — | — | Tinting agent A | 5 |
| Comparative Example 11 | PET | 0.65 | 1.3 | Titanium catalyst A | 5 | — | — | — | — |

TABLE 8

| | Intrinsic viscosity | Color | | | Element content (mmol %) | | | | | Quantitatic analysis result of metal components with true specific gravity of 5.0 or more | $M_p/M_{Ti}$ ratio# |
|---|---|---|---|---|---|---|---|---|---|---|---|
| Example No. | | L* | a* | b* | Ti* | P$ | Al | Sb | Mn | | |
| Example 16 | 0.62 | 73.5 | −6.2 | 2.6 | 5 | 0 | 0 | 0 | 0 | Not detected | 0 |
| Comparative Example 11 | 0.62 | 81.3 | −6.4 | 12.1 | 5 | 0 | 0 | 0 | 0 | Not detected | 0 |

TABLE 9

| | Evaluation result of polyester fibers | | | |
|---|---|---|---|---|
| | Height of accumulation of foreign matter | Color | | |
| Example No. | on spinneret (μm) | L* | a* | b* |
| Example 16 | 3 | 92.1 | −0.7 | 2.4 |
| Comparative Example 11 | 3 | 95.6 | −0.7 | 11.0 |

Notes of Table 7
PET: Polyethyelene terephthalate
DEG: Diethylene glycol
The catalyst compounds and phosphorus compounds were added in the amounts (m mole %) based on the molar amount of DMT.

Notes of Table 8
The color of the polyester resin composition chips was measured after heat-treating the chips at 140° C. for 2 hours.
Ti*: Concentration of metal elements contained in the polyester resin composition and soluble in the resin composition.
$) P: Concentration of phosphorus element contained in the polyester resin component
&) The contents of Sb, Mn element are in the units of ppm by mass.
) P/Ti ratio: Mollar ratio of phosphorus element to titanium metal element contained in the catalyst in the aromatic polyester polymer The contents (m mole %) of elements in the aromatic polyester polymer were calculated per mole of repeating units in the polymer.

In Example 16 according to the present invention, the polymer had a good color even in the chip form and the yarn form. However, in Comparative Example 11, the polymer was discolored yellowish in the chip form and the yarn form and the polymer color was unsatisfactory.

INDUSTRIAL APPLICABILITY

The tinted polyester resin composition of the present invention, and the shaped articles comprising the same, have good color and high applicability to many uses.

The invention claimed is:

1. A tinted polyester resin composition comprising an aromatic polyester polymer and a tinting agent, wherein
    (a) the tinting agent is present in a content of 0.1 to 10 ppm by mass, and comprises either:
    a mixture of a blue color-tinting coloring matter and a violet color-tinting coloring matter in a mass ratio in the range of from 90:10 to 40:60; or
    a mixture of a blue color-tinting coloring matter and a red or orange color-tinting coloring matter in a mass ratio in the range of from 98:2 to 80:20,
    (b) a maximum absorption wavelength of the tinting agent in an absorption spectrum in the wavelength range of 380 to 780 nm is in the range of 540 to 600 nm, determined in a chloroform solution of the tinting agent in a concentration of 20 mg/liter and at an optical path having a length of 1 cm, and
    (c) ratios of optical absorbances $A_{400}$, $A_{500}$, $A_{600}$ and $A_{700}$ of visible light spectra at wavelengths of 400 nm, 500 nm, 600 nm and 700 nm respectively to an optical absorbance $A_{max}$ in the visible light spectrum at the maximum absorption wavelength, of the tinting agent, determined in the above-mentioned chloroform solution o f the tinting agent at the optical path having a length of 1 cm, satisfy the requirements (1) to (4):

$$0.00 \leq A_{400}/A_{max} \leq 0.20 \tag{1}$$

$$0.10 \leq A_{500}/A_{max} \leq 0.70 \tag{2}$$

$$0.55 \leq A_{600}/A_{max} \leq 1.00 \tag{3}$$

$$0.00 \leq A_{700}/A_{max} \leq 0.05 \tag{4}$$

2. The tinted aromatic polyester resin composition as claimed in claim 1, wherein the tinting agent is selected from tinting coloring matters having a mass reduction-initiating temperature of 250° C. or more, determined by heating the coloring matters in a nitrogen gas atmosphere at a temperature-increasing rate of 10° C./minute while measuring the mass of the coloring matters by using a thermobalance.

3. The tinted aromatic polyester resin composition as claimed in claim 1, wherein a cobalt metal element in the composition is present in a content controlled to 10 ppm by mass or less on the basis of the mass of the composition.

4. The tinted aromatic polyester resin composition as claimed in claim 1, wherein a metal element having a true specific gravity of 5.0 or more, in the composition, is present in a content controlled to 10 ppm by mass on the basis of the mass of the composition.

5. The tinted aromatic polyester resin composition as claimed in claim 1, wherein the aromatic polyester polymer is one produced by using a catalyst comprising at least one member selected from the group consisting of titanium compounds and aluminum compounds.

6. The tinted aromatic polyester resin composition as claimed in claim 1, wherein the aromatic polyester polymer is one produced by using a catalyst comprising at least one member selected from the group consisting of titanium compounds and phosphorus compounds; a molar ratio of phosphorus atoms to titanium atoms contained in the catalyst satisfies the requirement (5):

$$1 \leq M_p/M_{Ti} \leq 15 \quad (5)$$

wherein $M_p$ and $M_{Ti}$ respectively represent contents in millimoles of phosphorus element and titanium atoms contained in the aromatic polyester polymer; and the molar amount of the titanium metal element in the residual catalyst dissolved and contained in the polyester resin composition is in the range of $2\times10^{-3}$ to $15\times10^{-3}$% on the basis of the molar amount of all dicarboxylic acids contained, as a polyester-constituting component, in the above-mentioned polymer.

7. The tinted aromatic polyester resin composition as claimed in claim 1, wherein the aromatic polyester polymer comprises, as a principal component, at least one member selected from the group consisting of polyethylene terephthalate, polyethylene naphthalate, polytrimethylene terephthalate, polytrimethylene naphthalate, polytetramethylene terephthalate and polytetramethylene naphthalate.

8. The tinted aromatic polyester resin composition as claimed in claim 1, wherein the tinting agent comprises a blue color-tinting coloring matter and a violet color-tinting coloring matter in a mass ratio in the range of from 90:10 to 40:60.

9. The tinted aromatic polyester resin composition as claimed in claim 1, wherein the tinting agent comprises a blue color-tinting coloring matter and a red or orange color-tinting coloring matter in a mass ratio in the range of from 98:2 to 80:20.

10. The tinted aromatic polyester resin composition as claimed in claim 1, wherein the tinting agent is one mixed, at one or more stages in the production procedure of the aromatic polyester polymer, into a reaction mixture in the production procedure.

11. The tinted aromatic polyester resin composition as claimed in claim 1, wherein the tinting agent is one knead-mixed into the aromatic polyester polymer in the state of a melt.

12. A tinted and shaped polyester resin article produced from the tinted polyester resin composition as defined in any one of claims 1 to 11.

13. The tinted and shaped polyester resin article as claimed in claim 12, selected from fiber products.

14. The tinted and shaped polyester resin article as claimed in claim 12, selected from film products.

15. The tinted and shaped polyester resin article as claimed in claim 12, selected from bottle products.

* * * * *